United States Patent
Bent et al.

(12)

(10) Patent No.: US 10,262,000 B1
(45) Date of Patent: Apr. 16, 2019

(54) GLOBAL DISTRIBUTED FILE APPEND USING LOG-STRUCTURED FILE SYSTEM

(71) Applicant: EMC Corporation, Hopkinton, MA (US)

(72) Inventors: John M. Bent, Los Alamos, NM (US); Sorin Faibish, Newton, MA (US); Gary Grider, Los Alamos, NM (US); Aaron Torres, Los Alamos, NM (US)

(73) Assignees: EMC Corporation, Hopkinton, MA (US); Los Alamos National Security, LLC, Los Alamos, NM (US)

( * ) Notice: Subject to any disclaimer, the term of this patent is extended or adjusted under 35 U.S.C. 154(b) by 858 days.

(21) Appl. No.: 13/921,657

(22) Filed: Jun. 19, 2013

(51) Int. Cl.
*G06F 17/30* (2006.01)

(52) U.S. Cl.
CPC .............................. *G06F 17/3007* (2013.01)

(58) Field of Classification Search
CPC ......... G06F 17/30445; G06F 17/30321; G06F 17/30336; G06F 17/30575; G06F 17/30286
USPC ....... 707/746, 737, 736, 755, 764, 770, 809, 707/810
See application file for complete search history.

(56) References Cited

U.S. PATENT DOCUMENTS

| | | | |
|---|---|---|---|
| 8,825,652 B1* | 9/2014 | Faibish | G06F 17/302 707/737 |
| 2004/0205377 A1* | 10/2004 | Nakamura | G06F 11/1494 714/4.5 |
| 2009/0307249 A1* | 12/2009 | Koifman | G06F 3/0623 |

OTHER PUBLICATIONS

Bent et al.; "PLFS: A Checkpoint Filesystem for Parallel Applications", 2009 Association for Computing Machinery; SC09 Nov. 14-20; 12 pages.*

(Continued)

*Primary Examiner* — Monica M Pyo
(74) *Attorney, Agent, or Firm* — Ryan, Mason & Lewis, LLP

(57) ABSTRACT

Techniques are provided for globally appending data from a group of distributed processes to a shared file using a log-structured file system. Data generated by a plurality of processes in a parallel computing system are appended to a shared file by storing the data to the shared file using a log-structured file system (such as a Parallel Log-Structured File System (PLFS)); and generating an index entry for the data, the index entry comprising a logical offset entry and a timestamp entry indicating a time of the storage, wherein the logical offset entry is resolved at read time. The logical offset entry can be populated with an append placeholder that is resolved when the shared file is read. At read time, a plurality of the index entries associated with the shared file can be sorted using the timestamp entry to deliver the requested shared file to a requesting application.

24 Claims, 4 Drawing Sheets

(56) References Cited

OTHER PUBLICATIONS

Grider et al. "U.S. Department of Engergy Best Practices Workshop on File Systems & Archives", LANL Release LA-UR-11-11416; Sep. 26-27, 2011; 5 pages.*
He et al. "I/O Acceleeration with Pattern Detection" HPDC'13, Jun. 17-21, 2013; 12 pages.*
Manzanares et al. "The Power and Challenges of Transformative I/O"; 2012 IEEE International Conference on Cluster Computing; 11 pages.*
Xu et al., "Parallel I/O Framework for Data-Intensive Parallel Applications," Poster in PDSW'12 workshop in conjunction with SC12.
Ghemawat et al., "The Google File System," http://research.google.com/archive/gfs.html.

* cited by examiner

| LOGICAL OFFSET | PHYSICAL DATA STREAM ID | PHYSICAL OFFSET | LENGTH | TIMESTAMP |

```
plfs_append(buffer=b,len=l) {

// append the data to the datalog
    fd=open(O_APPEND,datalog) // optimization: cache this!
    physical_offset = stat(datalog) // and cache this too!
    write(fd,b,l)

// create an "append" index entry
    idx_ntry=new plfs_index_entry()
    idx_ntry.offset = PLFS_APPEND // special MACRO
    idx_ntry.physical_offset = physical_offset
    idx_ntry.length = l // now append the index entry to the index file
    fd=open(O_APPEND,indexlog) // cache this too!
    write(fd,&idx_ntry, sizeof(plfs_index_entry) // buffer this!

```
# the following code shows how deterministic
# offsets are calculated at read time
# this shows how the index entries on disk which have a placeholder
for logical offset get pulled into memory and assign offsets read index entries on disk into memory index sorted by timestamp
memory_idx = new sorted vector
foreach disk_idx_entry
    memory_idx.insert(disk_idx_entry, disk_idx_entry.timestep)

# then iterate through and assign an offset to each
offset = 0
foreach entry in memory_idx
    entry.offset = offset
    offset += chunk.length
```

GLOBAL DISTRIBUTED FILE APPEND USING LOG-STRUCTURED FILE SYSTEM

STATEMENT OF GOVERNMENT RIGHTS

This invention was made under a Cooperative Research and Development Agreement between EMC Corporation and Los Alamos National Security, LLC. The United States government has rights in this invention pursuant to Contract No. DE-AC52-06NA25396 between the United States Department of Energy and Los Alamos National Security, LLC for the operation of Los Alamos National Laboratory.

FIELD

The present invention relates to the global appending of data from a group of distributed processes to a shared file.

BACKGROUND

Parallel storage systems are widely used in many computing environments. Parallel storage systems provide high degrees of concurrency in which many distributed processes within a parallel application simultaneously access a shared file namespace. Parallel computing techniques are used in many industries and applications for implementing computationally intensive models or simulations. For example, the Department of Energy uses a large number of distributed compute nodes tightly coupled into a supercomputer to model physics experiments. In the oil and gas industry, parallel computing techniques are often used for computing geological models that help predict the location of natural resources. One particular parallel computing application models the flow of electrons within a cube of virtual space by dividing the cube into smaller sub-cubes and then assigning each sub-cube to a corresponding process executing on a compute node.

In many parallel computing applications, a group of distributed processes must often globally append data to a shared file. When multiple processes attempt to append data to a shared file concurrently, however, the performance of the parallel storage system will be impaired. Serialization can cause significant performance degradation as the parallel processes must remain idle while they wait for one another. Serialization is incurred when the parallel file system locks a shared file in order to maintain the consistency of the shared file.

A number of techniques have been proposed or suggested to organize the data streams when multiple processes simultaneously save data to a shared file. For example, each process can create a single file across a set of different directories and then sequentially write a large amount of data to the single file. In a further implementation, a single process (often referred to as a "leader") can create a shared file, and then all the processes write to the shared file in segments that are aligned with block boundaries within the parallel file system.

A need therefore exists for improved techniques for globally appending data from a group of distributed processes to a shared file.

SUMMARY

Embodiments of the present invention provide improved techniques for globally appending data from a group of distributed processes to a shared file using a log-structured file system. In one embodiment, data generated by a plurality of processes in a parallel computing system are appended to a shared file by storing the data to the shared file using a log-structured file system (such as a Parallel Log-Structured File System (PLFS)); and generating an index entry for the data, the index entry comprising a logical offset entry and a timestamp entry indicating a time of the storage, wherein the logical offset entry is resolved at read time.

In one exemplary embodiment, the logical offset entry is populated with an append placeholder that is resolved when the shared file is read. According to a further aspect of the invention, at read time, a plurality of the index entries associated with the shared file can be sorted using the timestamp entry to deliver the requested shared file to a requesting application. In this manner, multiple write streams from the plurality of processes are reconstructed to a single logical file in a single read stream. A mapping of a deterministic location for each of a plurality of data chunks in the shared file is optionally deferred until a reading application opens the shared file.

Advantageously, illustrative embodiments of the invention globally append data from a group of distributed processes to a shared file using a log-structured file system. Global append operations in accordance with aspects of the present invention reduce data processing and transfer bandwidth costs, and preserve valuable disk space.

These and other features and advantages of the present invention will become more readily apparent from the accompanying drawings and the following detailed description.

BRIEF DESCRIPTION OF THE DRAWINGS

FIG. 3 illustrates an exemplary index entry for the exemplary shared file of FIGS. 1 and 2;

FIG. 4 illustrates exemplary pseudo code for a write operation for globally appending data from a group of distributed processes to the shared file of FIG. 1; and FIG. 5 illustrates exemplary pseudo code for a read operation that provides a requested shared file of FIG. 2 to the requesting application.

DETAILED DESCRIPTION

Figure 1:
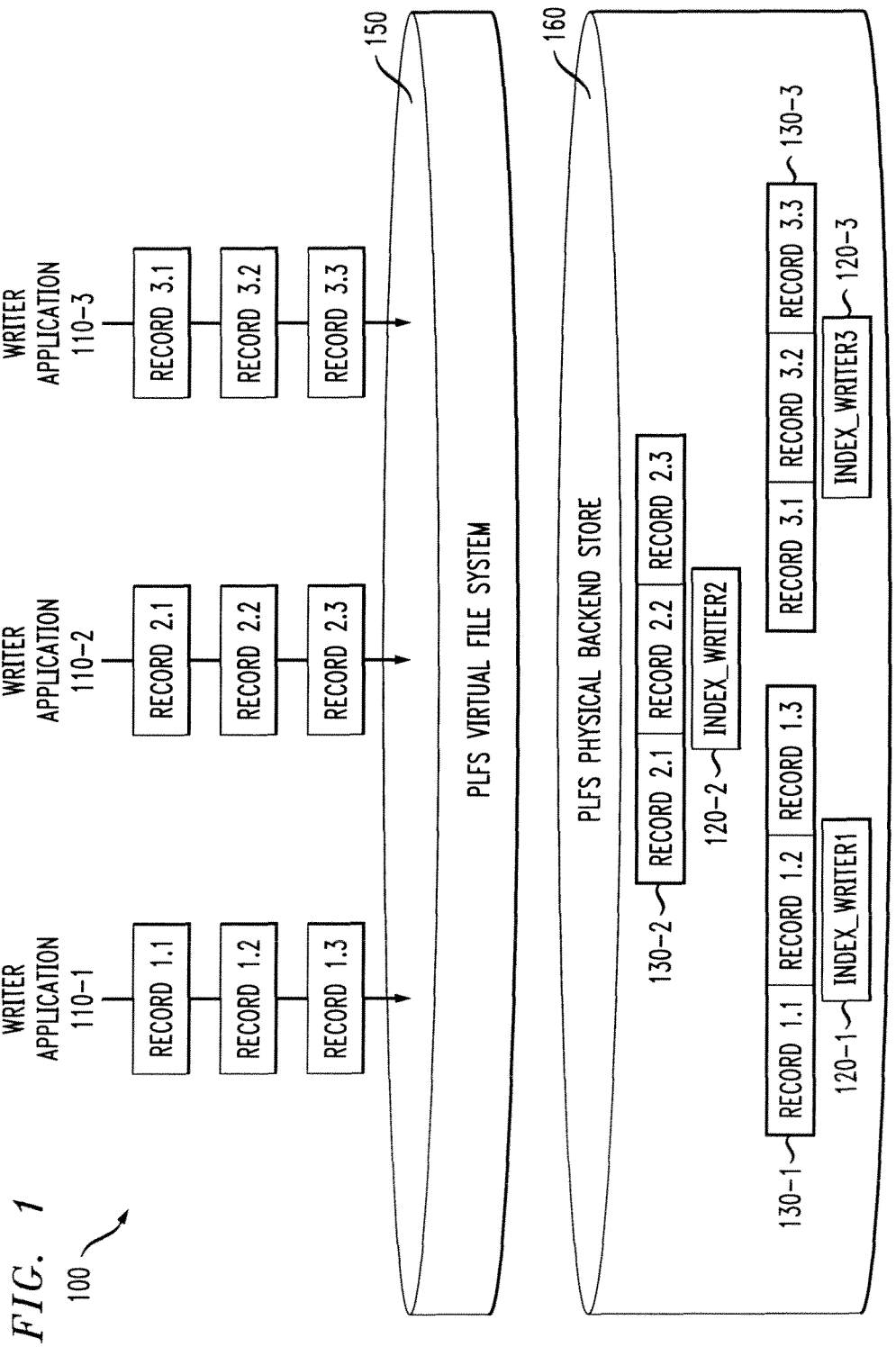
FIG. 1 illustrates a plurality of exemplary writer applications that append to a shared file that is stored in a file system in accordance with aspects of the invention.

The present invention provides improved techniques for globally appending data from a group of distributed processes to a shared file using a log-structured file system. Embodiments of the present invention will be described herein with reference to exemplary computing systems and data storage systems and associated servers, computers, storage units and devices and other processing devices. It is to be appreciated, however, that embodiments of the invention are not restricted to use with the particular illustrative system and device configurations shown. Moreover, the phrases "computing system" and "data storage system" as used herein are intended to be broadly construed, so as to encompass, for example, private or public cloud computing or storage systems, as well as other types of systems comprising distributed virtual infrastructure. However, a given embodiment may more generally comprise any arrangement of one or more processing devices.

According to one aspect of the invention, data from a group of distributed processes is globally appended to a shared file using a log-structured file system, to reduce the overhead involved in the creation and storage of data stored in a shared file. Generally, the shared file is created by the log-structured file system to store the data that has been generated by a plurality of processes. The data from the plurality of processes is sequentially stored in a smaller amount of physical storage space.

In one exemplary embodiment, the file system that globally appends the data from the plurality of files to a shared file is implemented using the Parallel Log-Structured File System (PLFS), as modified herein to provide the features and functions of the present invention. See, for example, John Bent et al., "PLFS: A Checkpoint Filesystem for Parallel Applications," Int'l Conf. for High Performance Computing, Networking, Storage and Analysis 2009 (SC09) (November 2009), incorporated by reference herein.

A parallel log-structured file-system allows non-locking, non-coordinated global appending of data from a group of distributed processes to a shared file. Aspects of the present invention are particularly suitable for applications that write fixed sized records that do not require a deterministic position within the shared file. In addition, aspects of the present invention can be employed with unmodified client applications that open a shared file in append mode.

According to one aspect of the invention, a PLFS log-structured file-system is augmented to allow a new metadata descriptive element that positions a chunk of data at the indeterministic logical end of the file. Currently, PLFS metadata specifies a deterministic integer based offset for each data chunk when the data chunk is written. Existing PLFS systems use the deterministic placement information to discover where appropriate data is when it is requested by a reading application.

Aspects of the present invention defer mapping a deterministic location for each data chunk until a reading application opens the file. PLFS will then find every chunk that was appended to the indeterministic logical end and order those chunks. For example, PLFS can use timestamps to order the chunks with alpha-ordering on the node-name of the writing application 110 in the event of a tie.

As discussed further below in conjunction with FIG. 1, an important enabling factor is that PLFS separates (decouples) the write stream for multiple writing applications 110 to a single file into multiple write streams. At read time, as discussed further below in conjunction with FIG. 2, PLFS then reassembles the streams into a read stream. Therefore, multiple writing applications 110 can simultaneously write to the logical end of the file without interfering with each other and defer computing the physical offset of each write until read time.

Distributed Global Append

FIG. 1 illustrates a plurality of exemplary writer applications 110-1 through 110-3 that append data records 1.1-1.3, 2.1-2.3, 3.1-3.3 to a shared file that is stored in a file system 100 in accordance with aspects of the invention. The exemplary writer applications 110 provide the data records 1.1-1.3, 2.1-2.3, 3.1-3.3 to a virtual file system 150, such as PLFS. The virtual file system 150 then stores the data records 1.1-1.3, 2.1-2.3, 3.1-3.3 in an actual file system 160, such as a PLFS physical backend store. The virtual file system 150 may comprise, for example, a burst buffer (e.g., flash memory) to process the shared files. As discussed further below in conjunction with FIG. 4, the virtual file system 150 employs a write operation to globally append the data records 1.1-1.3, 2.1-2.3, 3.1-3.3 from the writer applications 110 to the shared file. As shown in FIG. 1, the virtual file system 150 creates (i) a separate log file 130-1 through 130-3 for each writer application 110-1 through 110-3 on the PLFS physical backend store 160 to store the appended data records, such as log file 130-1 for data records 1.1-1.3 for the first writer application 110-1, and (ii) creates a separate index file 120-1 through 120-3 indicating where the data logs are and what the data logs contain, such as Index_writer 1 (120-1) for the first writer application 110-1. An exemplary index file is discussed further below in conjunction with FIG. 3. An exemplary index entry 300 for a given data record comprises a logical offset, a physical data stream identifier, a physical offset, a length and a timestamp indicating the time when the data record was written to the file system 160.

Figure 2:
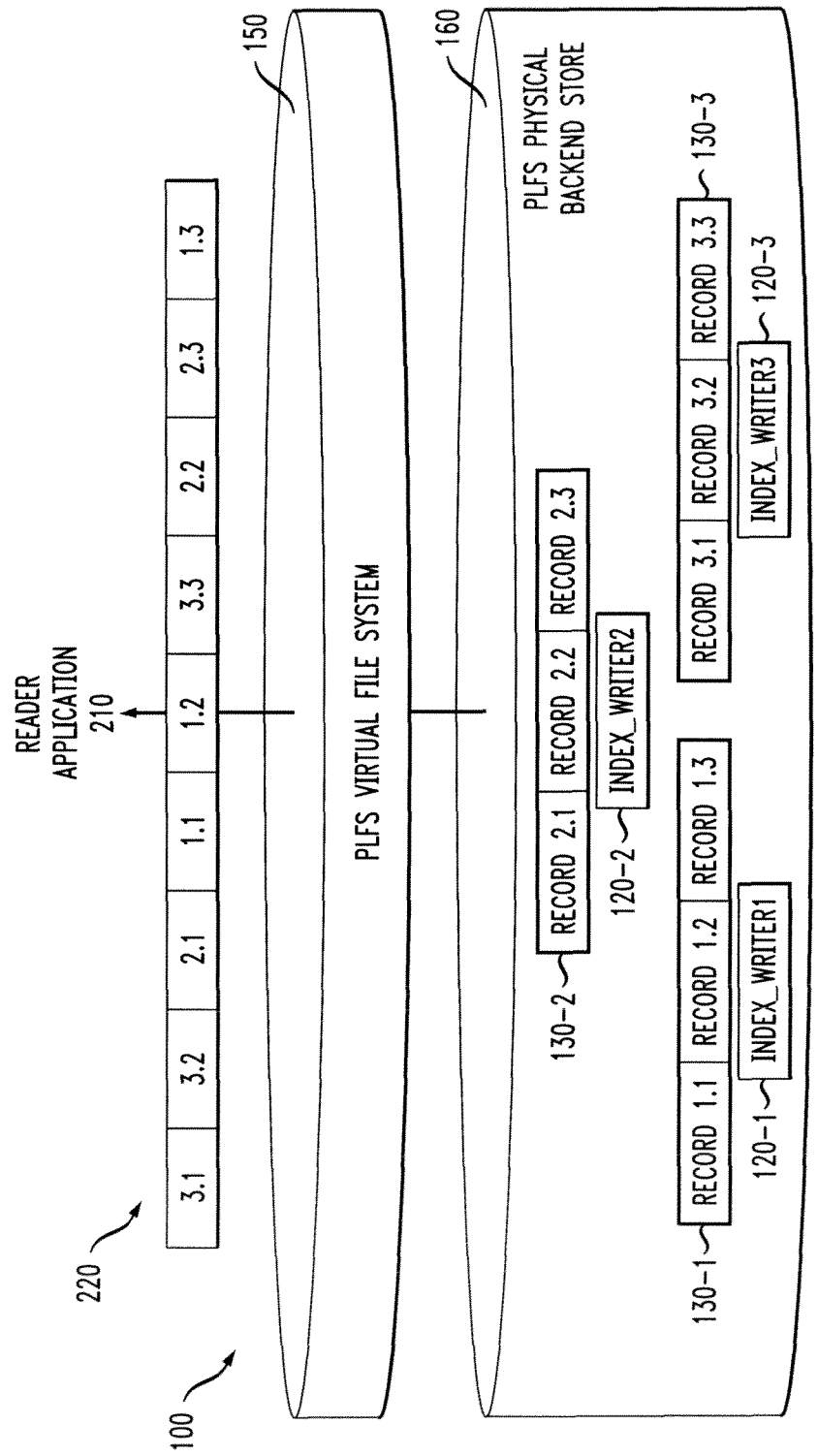
FIG. 2 illustrates an exemplary reader application that reads a shared file that is stored in a file system in accordance with aspects of the invention.

FIG. 2 illustrates an exemplary reader application 210 that reads a shared file 220 that is stored in a file system in accordance with aspects of the invention. When the exemplary reader application 210 requests to read the shared file 220, the virtual file system 150 employs a read operation, as discussed further below in conjunction with FIG. 5, to process the indexes 120 in the physical backend store 160 to compare timestamps of every written data record to sort the data records and construct a view of the shared file 220. The shared file 220 is then delivered to the requesting reader application 210.

In this manner, the PLFS virtual file system 150 employs the indexing mechanism to reconstruct multiple write streams from a plurality of writing applications 110 to a single logical file 220 into a single consistent read stream.

FIG. 3 illustrates an exemplary index entry 300 for a data record in the exemplary shared file 220 of FIGS. 1 and 2. As shown in FIG. 3, the exemplary index entry 300 for a given data record comprises a logical offset, a physical data stream identifier, a physical offset, a length and a timestamp indicating the time when the data record was written to the file system 160. The physical data stream identifier identifies the shared file 220 (i.e., the logical file). The writer application 110 is writing to the logical file and the PLFS virtual file system 150 is appending the data to one of a set of physical data log files and then creating an index entry 300 to record where the data is stored. Thus, physical data stream identifier is the identifier for which of the set of physical data log files 130 has this particular bit of data.

In accordance with one aspect of the invention, when a data record is written, the logical offset in the exemplary index entry 300 is populated with an append value or keyword placeholder (which is resolved at read time). The remaining entries in the exemplary index entry 300 are populated in a known manner. Thereafter, at read time, the PLFS virtual file system 150 employs the timestamp entry from each index entry 300 to reconstruct multiple write streams from a plurality of writing applications 110 to a single logical file 220 in a single consistent read stream.

FIG. 4 illustrates exemplary pseudo code 400 for a write operation for globally appending data from a group of distributed processes to the shared file 220. The write pseudo code 400 receives as arguments a buffer (i.e., the actual data being written), length and the logical offset field is set to the "append" placeholder, and creates an index entry 300 that is appended to the particular index 120 corresponding to the writer application 110. For example, if a string "Hello world!" is written to a file, the program will create a memory buffer, put "Hello world!" into that buffer and then pass a pointer to that buffer to the write( ) function call.

FIG. 5 illustrates exemplary pseudo code 500 for a read operation that is performed to provide a requested shared file of FIG. 2 to the requesting application 210. As indicated above, when the exemplary reader application 210 requests to read the shared file 220, the virtual file system 150 employs a read operation shown in FIG. 5 to process the indexes 120 in the physical backend store 160 to compare timestamps of every written data record to sort the data records and construct a view of the shared file 220. The shared file 220 is then delivered to the requesting reader application 210.

The exemplary pseudo code 500 sorts the index entries 300 by timestamp and then deterministic offsets are calculated for each index entry 300. The index entries 120 on the physical backend store 160 (having an append placeholder for logical offset) are processed to assign offsets.

Among other benefits, the disclosed global append approach is asynchronous and un-coordinated. While other approaches find a deterministic offset for the logical file end at write time, the present invention calculates the deterministic offsets for the logical file at read time, thereby allowing write operations to proceed more quickly.

As indicated above, a parallel log-structured file-system allows non-locking, non-coordinated global appending of data from a group of distributed processes to a shared file. The present invention is particularly suitable for applications that write fixed sized records that do not require a deterministic position within the shared file. Aspects of the present invention can be employed with unmodified client applications that open a shared file in append mode.

Numerous other arrangements of servers, computers, storage devices or other components are possible. Such components can communicate with other elements over any type of network, such as a wide area network (WAN), a local area network (LAN), a satellite network, a telephone or cable network, or various portions or combinations of these and other types of networks. One or more of the devices in this implementation include a processor or another hardware device coupled to a memory and a network interface. These device elements may be implemented in whole or in part as a conventional microprocessor, digital signal processor, application-specific integrated circuit (ASIC) or other type of circuitry, as well as portions or combinations of such circuitry elements. As will be appreciated by those skilled in the art, the methods in accordance with the present invention, such as those described in conjunction with FIGS. 4 and 5, can be implemented at least in part in the form of one or more software programs that are stored in the device memory and executed by the corresponding processor. The memory is also used for storing information used to perform computations or other operations associated with the invention.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of information processing systems, data storage systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method for appending data generated by a plurality of processes in a parallel computing system to a shared file, comprising the steps of:
    storing, using at least one processing device, said data from said plurality of processes to a non-deterministic logical end of said shared file in a storage medium using a log-structured file system;
    generating, using at least one processing device, an index entry for said data, said index entry comprising a logical offset entry and a timestamp entry indicating a time of said storage into said shared file in said storage medium; and
    constructing a view of the shared file at read time by (i) sorting, at said read time, a plurality of said timestamp entries for said shared file indicating said time of said storage of said data from said plurality of processes into said shared file in said storage medium, and (ii) determining, at said read time, a deterministic location for each of a plurality of data chunks in the shared file based on the sorted timestamp entries, wherein the shared file is shared by said plurality of processes.

2. The method of claim 1, further comprising the step of populating said logical offset entry with an append placeholder that is resolved when said shared file is read.

3. The method of claim 1, wherein said sorting further comprises the step of reconstructing multiple write streams from said plurality of processes to a single logical file in a single read stream.

4. The method of claim 1, wherein said sorting defers a mapping of the deterministic location for each of a plurality of data chunks in said shared file until a reading application opens said shared file.

5. The method of claim 1, wherein said log-structured file system comprises a Parallel Log-Structured File System.

6. The method of claim 1, wherein said storing step further comprises the step of storing said data at a logical end of said shared file.

7. The method of claim 1, wherein said storing step creates a write stream for each of said plurality of processes.

8. The method of claim 7, wherein said write streams for said plurality of processes are reassembled into a single read stream at read time.

9. The method of claim 1, wherein said plurality of processes are running on a plurality of compute nodes.

10. The method of claim 1, wherein shared file is provided to a middleware virtual file system for storage.

11. The method of claim 1, wherein said shared file is stored on a parallel file system comprised of one or more disks.

12. A computer program product comprising a tangible machine-readable recordable storage medium having encoded therein executable code of one or more software programs, wherein the one or more software programs when executed by the processor of the processing device implement the steps of the method of claim 1.

13. An apparatus for appending data generated by a plurality of processes in a parallel computing system to a shared file, comprising:
    a memory; and
    at least one processing device operatively coupled to the memory and configured to:
    store, using at least one processing device, said data from said plurality of processes to a non-deterministic logical end of said shared file in a storage medium using a log-structured file system;

generate, using at least one processing device, an index entry for said data, said index entry comprising a logical offset entry and a timestamp entry indicating a time of said storage into said shared file in said storage medium; and construct a view of the shared file at read time by (i) sorting, at said read time, a plurality of said timestamp entries for said shared file indicating said time of said storage of said data from said plurality of processes into said shared file in said storage medium, and (ii) determining, at said read time, a deterministic location for each of a plurality of data chunks in the shared file based on the sorted timestamp entries, wherein the shared file is shared by said plurality of processes.

14. The apparatus of claim 13, wherein said at least one hardware device is further configured to populate said logical offset entry with an append placeholder that is resolved when said shared file is read.

15. The apparatus of claim 13, wherein said sorting further comprises reconstructing multiple write streams from said plurality of processes to a single logical file in a single read stream.

16. The apparatus of claim 13, wherein said sorting defers a mapping of the deterministic location for each of a plurality of data chunks in said shared file until a reading application opens said shared file.

17. The apparatus of claim 13, wherein said log-structured file system comprises a Parallel Log-Structured File System.

18. The apparatus of claim 13, wherein said data is stored at a logical end of said shared file.

19. The apparatus of claim 13, wherein a write stream is created for each of said plurality of processes.

20. The apparatus of claim 13, wherein said plurality of processes are running on a plurality of compute nodes.

21. The apparatus of claim 13, wherein shared file is stored on one or more of a middleware virtual file system one or more disks of a parallel file system.

22. A data storage system for appending data generated by a plurality of processes in a parallel computing system to a shared file, comprising:

a storage medium for storing said shared file and an index entry; and a hardware processing unit for (i) storing said data from said plurality of processes to a non-deterministic logical end of said shared file using a log-structured file system; and generating, using said hardware processing unit, said index entry for said data, said index entry comprising a logical offset entry and a timestamp entry indicating a time of said storage into said shared file in said storage medium, and (ii) constructing a view of the shared file at read time by (a) sorting, at said read time, a plurality of said timestamp entries for said shared file indicating said time of said storage of said data from said plurality of processes into said shared file in said storage medium, and (b) determining, at said read time, a deterministic location for each of a plurality of data chunks in the shared file based on the sorted timestamp entries, wherein the shared file is shared by said plurality of processes.

23. The data storage system of claim 22, wherein said sorting further comprises reconstructing multiple write streams from said plurality of processes to a single logical file in a single read stream.

24. The data storage system of claim 22, wherein said sorting defers a mapping of the deterministic location for each of a plurality of data chunks in said shared file until a reading application opens said shared file.

* * * * *